United States Patent [19]
Wagner et al.

[11] Patent Number: 5,232,302
[45] Date of Patent: Aug. 3, 1993

[54] FIXING MEANS FOR CONNECTING COMPONENTS

[75] Inventors: Harald Wagner, Mauthausen; Alfred Schulter; Siegfried Strohhäusl, both of Linz, all of Austria

[73] Assignee: Mayreder Consult of the United States Inc., Bowie, Md.

[21] Appl. No.: 636,775

[22] Filed: Jan. 2, 1991

[30] Foreign Application Priority Data

Jan. 10, 1990 [AT] Austria ................... A 41/90

[51] Int. Cl.$^5$ .............................. F16B 13/04
[52] U.S. Cl. .................... 403/298; 403/292; 403/280; 411/510; 52/585
[58] Field of Search ............... 403/298, 297, 292, 280; 411/338, 339, 508-510, 913, 82; 52/585, 225

[56] References Cited

U.S. PATENT DOCUMENTS

| | | | |
|---|---|---|---|
| 3,563,582 | 2/1971 | Shroyer | 52/585 X |
| 3,676,898 | 7/1972 | Rock | 52/585 X |
| 3,767,233 | 10/1973 | Hodge | 403/292 X |
| 3,883,258 | 5/1975 | Hewson | 403/298 |
| 3,966,339 | 6/1076 | Nemecek et al. | 403/292 |
| 4,454,699 | 6/1984 | Strohl | 403/298 X |
| 4,484,407 | 11/1984 | Petersson | 403/292 X |
| 4,660,681 | 4/1987 | Zenhausern | 411/510 X |
| 5,005,892 | 4/1991 | Haugen et al. | 403/298 X |

FOREIGN PATENT DOCUMENTS

| | | | |
|---|---|---|---|
| 0100771 | 8/1982 | European Pat. Off. | |
| 0114514 | 12/1983 | European Pat. Off. | |
| 0358223 | 3/1990 | European Pat. Off. | 403/298 |
| 2238792 | 8/1972 | Fed. Rep. of Germany | |
| 2457427 | 12/1974 | Fed. Rep. of Germany | |
| 2418198 | 10/1975 | Fed. Rep. of Germany | 403/292 |

Primary Examiner—Randolph A. Reese
Assistant Examiner—Harry C. Kim
Attorney, Agent, or Firm—Collard & Roe

[57] ABSTRACT

Fixing devices for connecting components, particularly prefabricated concrete members and tubbing stones, consist of pluglike anchors adapted to be forced with elastic deformation into anchor holes, which are formed in the components and are open to the joint between the components. As a result, the anchors are frictionally held in and/or positively locked in the anchor holes. The anchors are substantially stiff and have a peripheral surface which at least in portions intended for a retaining engagement with the inside surface of the anchor hole is designed to be elastically deformable at least in an approximately radial direction. The surface consists at least in these portions of a plastic material which has entropy elasticity.

13 Claims, 3 Drawing Sheets

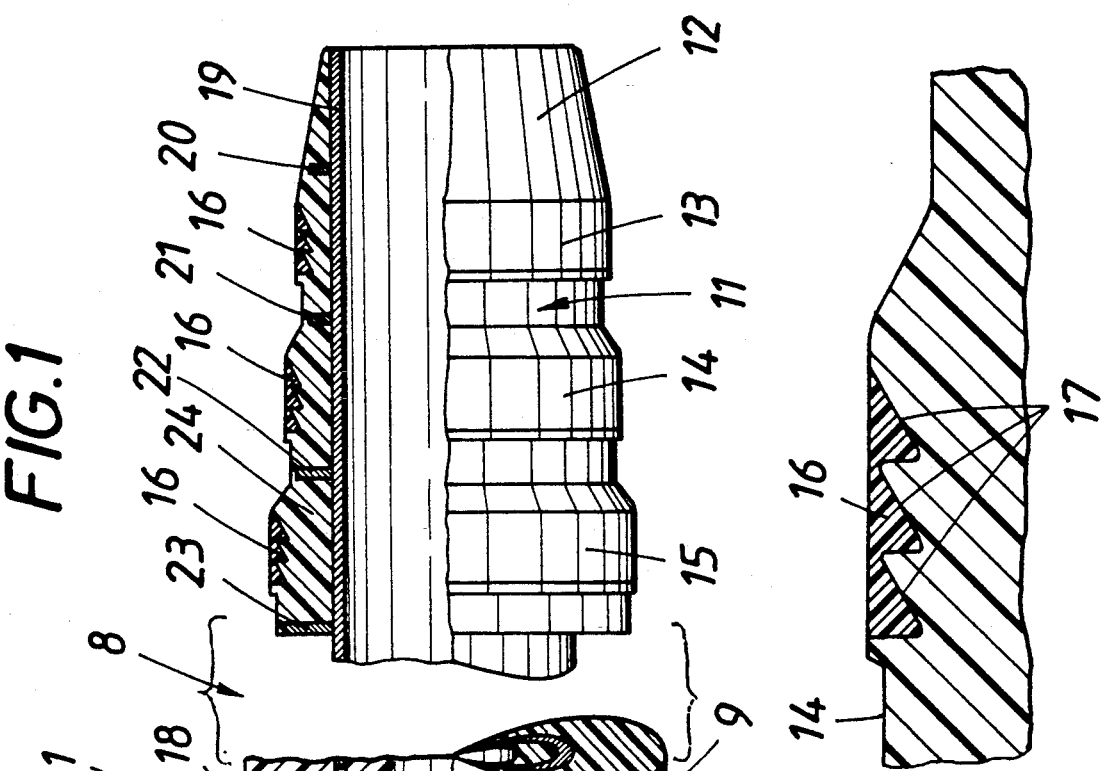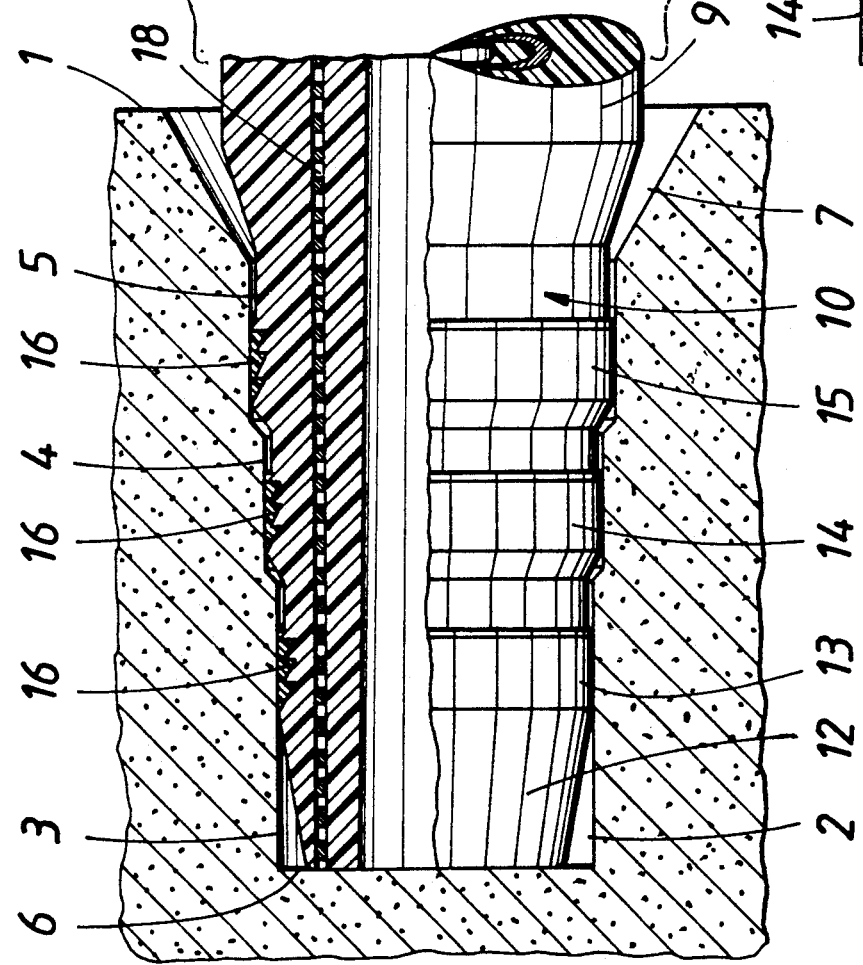
FIG.1
FIG.2

FIXING MEANS FOR CONNECTING COMPONENTS

BACKGROUND OF THE INVENTION

1. Field of the Invention

This invention relates to fixing means for connecting components, particularly prefabricated concrete members or tubbing stones, which means comprises a plurality of pluglike anchors adapted to be forced with elastic deformation into anchor holes formed in said components and open in facing surfaces of said components, so that the anchors are frictionally held in and/or positively locked in the anchor holes.

2. Description of the Prior Art

Fixing means of that kind are used, e.g., in the construction of tunnel linings, to connect the tubbing stones or other ring elements, and may be substituted for conventional screw fasteners, which are expensive and can be used only with difficulty and involve a weakening of the material. The anchors may be mounted before a new stone is installed so that the anchors may be used also to align an additional component with previously placed components so that a modular assembly of the components can be obtained. Other fields of application of fixing means of the present kind are joints between relatively large structural components, such as prefabricated concrete elements, in building construction and civil engineering.

From EP-A-100 771 it is known to connect tubbing stones by means of sleevelike liners, which are inserted into anchor holes and made of rubber-elastic or other elastically deformable material and have holes which flare conically near and toward the outer end of the sleeve but are cylindrical elsewhere. Anchors are employed which consist of cylindrical metal rods, which have pointed ends and are first driven into the anchor holes of one stone and as the stones are engaged with each other are inserted into the liners of the previously placed stone. The inside diameter of the cylindrical holes of the liners is smaller than the outside diameter of the metal rods so that said metal rods are inserted into the liners with elastic deformation and are frictionally retained therein. The elastic deformability of the sleevelike liners is intended to effect a correction of any misalignment of the axes of the metal rods and the axes of the associated anchor holes.

DE-A-22 38 792 provides for connecting platelike segments by fixing means which consist of sleeves, which are inserted into one component, and anchor bolts, which are fixed to the other component. Spring tongues are secured to the sleeve and protrude from the open free end of the sleeve. Said spring tongues are deflected and clamp the bolt as it is inserted into the sleeve so that a frictional contact is achieved. EP-A-114 514 discloses similar fixing means for connecting tubbing stones.

DE-A-24 57 427 discloses fixing means which are of the kind described first hereinbefore and comprise an anchor consisting of a steel bolt having in cross-section a sawtoothlike external shape but uniform crest and root diameters. That steel bolt is adapted to be forced into a liner, which has been inserted into the anchor hole and is made of rubber-elastic material and has on the outside a mating or corrugated shape in cross-section.

All these fixing means have the disadvantage that separate liners made, e.g., of rubber-elastic material must be inserted into the anchor holes so that the manufacture of the components is difficult. If the anchor and the liner in the anchor hole have corresponding shapes in cross-section, the restraining force will not be sufficiently large and from the beginning of the insertion of the anchor into the liner it is necessary to overcome the resistance of the liner to deformation until the anchor has been inserted as far as is required. In some designs that resistance to deformation progressively increases as that insertion proceeds. Particularly at the beginning of the insertion the anchor will be subjected to a high buckling load and this must be taken into account in the selection of the cross-sectional areas. Where fixing means which establish only a restraining frictional engagement are employed, the driving forces required and the restraining forces will not exactly be defined owing to the manufacturing tolerances. Similar remarks are applicable for a fixation by means of deflectable spring tongues.

SUMMARY OF THE INVENTION

It is an object of the invention to provide fixing means of the kind described first hereinbefore and simple in design, and particularly with simple anchor holes and permitting strong and definable restraining forces to be exerted on the anchors.

It is another object of the invention to provide fixing means in which the anchors can be more easily inserted into the anchor holes and the forces required to overcome the resistance to deformation need to be exerted only during a fractional part of the displacement of each anchor as it is inserted, ensuring that each anchor will reliably reach the required position in the anchor hole so that, sealing inserts provided between the components to be connected will reliably be subjected to the required initial stress.

The first object stated hereinbefore is accomplished with substantially stiff anchors that have a peripheral surface which at least in portions intended for a retaining engagement with the inside surface of the anchor hole is designed to be elastically deformable at least in an approximately radial direction.

According to the basic concept of the invention, the elastically deformable means required to exert the restraining forces is provided on the anchor and the anchor is designed to have in its axial direction a sufficiently high stiffness so that the anchor can be inserted without difficulty into the associated anchor hole.

The peripheral surface of the anchor may consist of a plastic material which has entropy elasticity.

Owing to the use of a plastic material which has entropy elasticity, the insertion of the anchor is facilitated and the retaining force exerted by and on the anchor which has been inserted is increased. The term entropy elasticity describes a flow behavior which is exhibited by plastics when, after an elastic deformation, they tend to assume their initial shape by creep movements or when, under the action of actual pressure forces they tend to flow into regions which are under a lower pressure load at that time so that the contact pressure forces will substantially be equalized when the flow process has terminated. In the present case that flow behavior can be utilizer by compressing the deformable peripheral portions of the anchor by means of separate devices or in constricted portions of the anchor holes and/or by displacing said deformable portions in the longitudinal direction of the anchor. When the anchor has been inserted into the anchor hole to the required extent, portions of the elastically deformed zones will flow into recesses formed in the inside surfaces of the anchor hole so that a positive and frictional anchoring will be obtained. A substantial anchoring action will be achieved even in anchor holes having a rough inside surface of concrete if, in the simplest case, substantially cylindrical anchor holes are provided as well as corresponding anchors which have elastically deformable zones which are larger in diameter than the adjacent zones of the holes. The anchoring action can substantially be increased by further measures, e.g., by the provision of undercuts in the inside surface of the anchor hole.

Surprisingly it has been found that a selection of proper materials will permit satisfactory results to be produced even if the peripheral surface of the anchor consists of wood, particularly of soft wood, if that wood is so arranged that its fibers extend substantially in the longitudinal direction of the anchor. Fir and spruce are preferably employed as soft woods, which have a much higher sitffness in the longitudinal direction of the fibers and have a high modulus of elasticity transversely to the direction of the fibers so that their retaining properties are similar to those of the above-mentioned plastic material. The entire anchor may consist of a wooden part in which the fibers extend in the longitudinal direction of the anchor and which has been impregnated to resist an ingress of moisture and outrefaction. The wooden part may be made in one piece or may consist of a plurality of elements, which have been joined, e.g., with glue and have then been given their final shape. Reinforcements and inserts such as will be mentioned hereinafter may be provided also in a wooden part.

In a preferred embodiment each anchor is formed in that portion which is to be inserted into one of the anchor holes with two or more retaining zones for engaging the inside surface of the anchor hole. It will be particularly desirable if the average diameters of the retaining zones of the anchors and of the anchor holes consecutively increase from one retaining zone. It will be particularly desirable if the average diameters of the retaining zones of the anchors and of the anchor holes consecutively increase from one retaining zone to the next in the direction extending away from the inner end of the anchor and anchor hole.

The provision of stepped anchors and anchor holes has the result that the deforming force to be exerted for a frictional and/or positive restraining engagement will have to be exerted only in the region in which associated restraining zones of the anchor or anchor hole engage each other, i.e., only toward the termination of the insertion of the anchor into the anchor hole and during a corresponding fractional part of the displacement by which the anchor is inserted into the anchor hole and it will be necessary to exert that force only when the anchor is already sufficiently guided in the anchor hole. That guidance will be improved by the fact that buckling loads on the anchor will substantially be avoided in all retaining zones and excessive loads will be avoided even when the anchor and the anchor hole are not exactly aligned during the assembling operation. On the contrary, the anchor will strictly act as a guiding element during a major part of the displacement by which the anchor is inserted into the associated anchor hole.

Within the basic design provided in accordance with the invention, various variations in detail may be adopted. In a preferred embodiment the retaining zones of the anchor are basically cylindrical or have a slender conical shape increasing in thickness toward the end of the anchor that is to be inserted into the anchor hole. Conical transition portions may be provided between the retaining zones. The slender conical shape which increases in thickness toward the free end of the anchor will improve the retention of the anchor in the anchor hole.

An embodiment may be adopted in which the anchor is provided in the retaining zones with annular pads which are made of a material which is more easily deformable and has a higher coefficient of friction than the remaining anchor material.

In accordance with a further preferred feature the annular pads are inserted in annular grooves which are provided on the peripheral surface of the anchor and have in axial section a sawtooth shape having sloping tooth side faces rising toward the inner end of the anchor. When a force tending to pull the anchor out of the anchor hole is exerted on the anchor, said sloping side faces will tend to effect an expanding deformation of the pad, which has an outside surface in contact with the inside surface of the anchor hole, so that the contact pressure exerted by the pad on the surface of the hole and the adhesive force will be increased.

In a different embodiment, comblike annular projections are provided in each retaining zone of the anchor hole and at least on that side which faces the inner end of the anchor hole define undercuts and have an inside diameter that is smaller than the outside diameter of the anchor in the associated zone. That design may be adopted for use with an anchor which can be elastically deformed at least in part and will have the result that when a retaining zone of the anchor has been forced past the annular projection the material of that zone will flow into the undercut so that the anchoring will be improved. The projections in the anchor hole may consist of annular inserts of metal which are held in the concrete. In order to increase the size of the undercuts provided behind said annular inserts, elastically deformable or detachable inserts may be provided on the rear of the rings before the concrete is cast.

In a further embodiment the anchors are made of plastic and provided with a metal reinforcement. The anchors can specifically be made of polyamide, polyethylene and polypropylene and the reinforcements preferably consist of iron or steel. Alternatively, mesh reinforcements may be provided or the cores of the anchors may be made of plastic reinforced with glass fibers. The distribution of the total stress to the plastic and reinforcement will be determined in view of the severity of the usage, the required life and the required strength. In a preferred embodiment the reinforcement consists of a longitudinal tube, which is embedded in the plastic and which is provided on the outside with retaining rings, which are embedded in the plastic material at the ends of each retaining zone. In that case the plastic material will be backed by a ring adjacent to each retaining zone so that the deforming forces to be exerted for the fixation and the retaining forces exerted by and on the installed anchor will be applied in a desirable manner.

The assembling may be facilitated if each anchor has conically tapered end portions and each anchor hole conically flares from the facing surfaces of the components to the nearest retaining zone of the anchor hole.

BRIEF DESCRIPTION OF THE DRAWING

FIG. 1 is a fragmentary sectional view showing a portion of a concrete member formed with an anchor hole together with an anchor one half of which has been inserted into said hole and another half is intended to be secured to another concrete member. Two different anchor embodiments are shown in the two halves of FIG. 1.

FIG. 2 is an enlarged fragmentary axial sectional view showing a retaining portion of the anchor in detail.

DETAILED DESCRIPTION OF THE PREFERRED EMBODIMENTS

Figure 3:
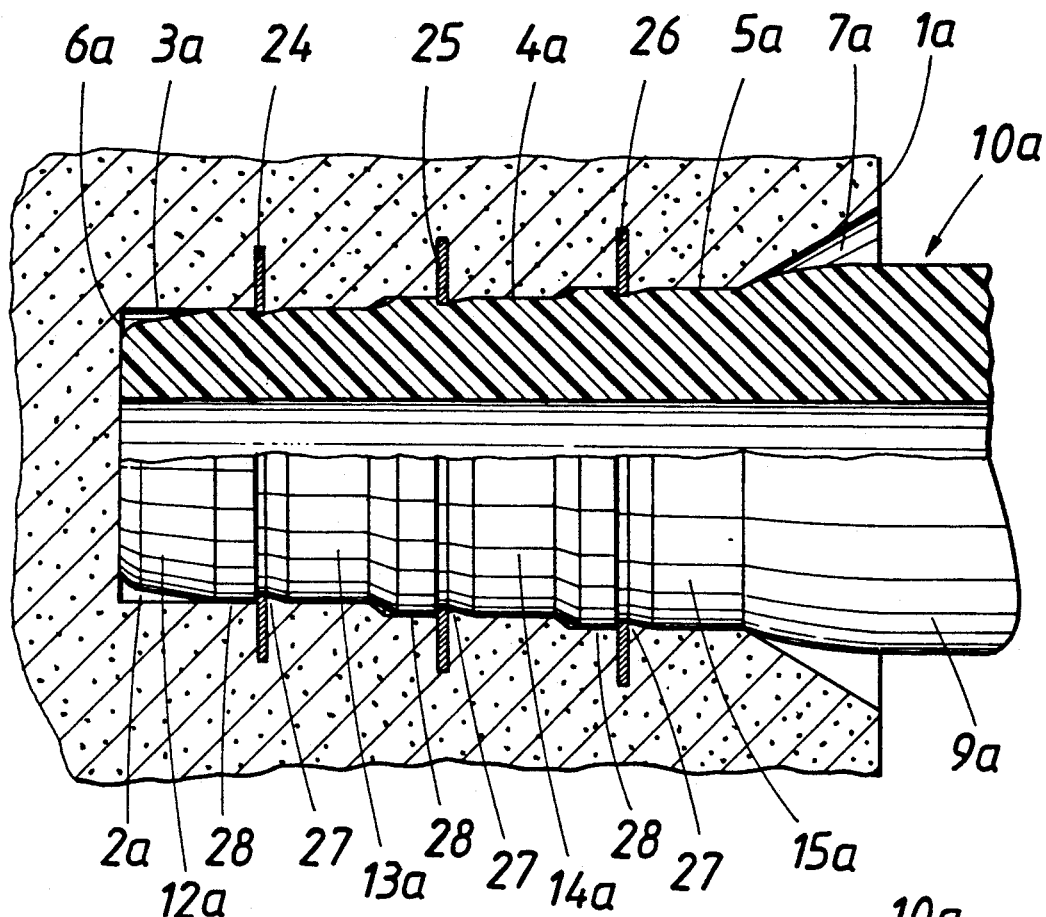
FIG. 3 is a view which corresponds to the left-hand half of FIG. 1 and shows a different fixing device.

The invention is illustrated by way of example on the drawings.

In accordance with FIGS. 1 and 2, two concrete members which are to be connected and consist, e.g., of tubbing stones associated with respective rings are formed on facing end faces 1 with spaced apart anchor holes 2. In the illustrated embodiments, each of said anchor holes comprises three longitudinally aligned, cylindrical retaining zones 3, 4, 5, which increase in diameter from the bottom 6 of the hole 2 toward the end face 1. A conical flaring portion 7 is provided in the hole 2 between the outermost retaining zone 5 and the end face 1.

A pluglike anchor 8 comprises two anchor heads 10, 11, which extend from a tubular intermediate member 9 and are normally identical. Each anchor head 10, 11 has a conical end portion 12 and has retaining zones 13, 14, 15 which are axially aligned like the retaining zones 3, 4, 5 of the anchor hole 2. As is particularly apparent from FIG. 2, the anchor 8 is provided adjacent to each of the retaining zones 13 to 15 with annular pads 16, which consist of a material that has a high coefficient of friction and is more easily deformable than the remaining material of the anchor. Said annular pads extend in annular grooves formed on the periphery of the anchor retaining zones. The bottom of each of said grooves has a sawtooth profile 17 in axial section. The sloping side faces of said teeth rise toward bottom 6 of the anchor hole so that a pulling force exerted on the anchor head 10 and tending to pull it out of the anchor hole 2 will cause the sloping tooth side faces to force radially outwardly the material of pads 16 which is in frictional contact with the inside surface of the anchor hole whereby the contact pressure applied to the inside surface of the hole will be increased in each of the engaged retaining zones 3, 4, and 5.

In the embodiment shown on the left in FIG. 1, a major part of the anchor head 10 consists of plastic and is provided with a reinforcing insert consisting of a perforated tube 18.

In the embodiment shown on the right in FIG. 1, the anchor comprises an inner tube 19, which carries retaining rings 20, 21, 22, 23 adjacent to the ends of the retaining zones 13, 14 and 15. Said retaining rings 20, 21, 22, 23 are embedded in the plastic material 24 which constitutes the shell of an anchor.

Figure 4:
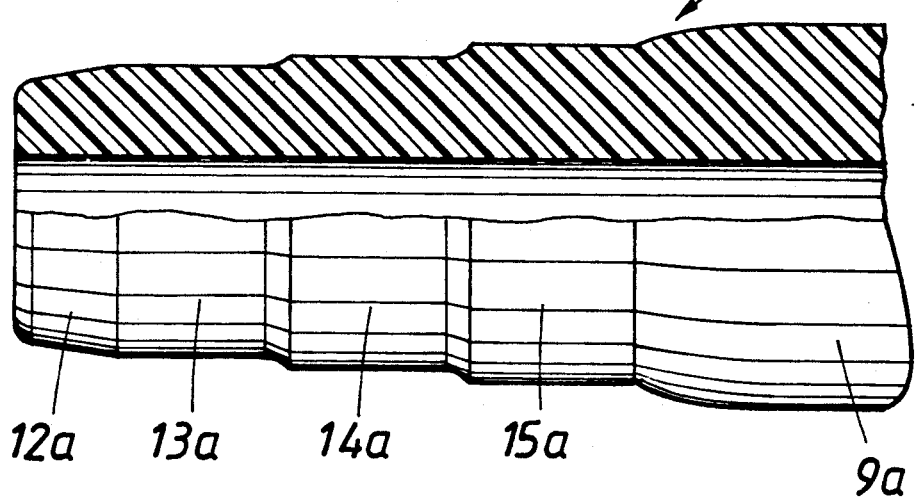
FIG. 4 is a fragmentary sectional view showing the anchor of the fixing device of FIG. 3 in an undeformed state.

In the embodiment shown in FIGS. 3 and 4, the anchor hole 2a is also formed with consecutive retaining zones 3a, 4a, 5a and the anchor head 10a extending from tubular anchor member 9a is also provided with retaining zones 13a, 14a, 15a, which differ in diameter. The body of the anchor 9a, 10a consists of a plastic material which is elastically deformable to a limited extent and which is optionally reinforced by glass fibers. Within the length of each of the retaining zones 3a, 4a and 5a of the anchor hole 2a, concentric rings 24, 25 and 26 are inserted into the inside surface of the anchor hole and each of said rings has an inner rim which is smaller in diameter than the outside diameter of the associated retaining zone 13a, 14a or 15a of the anchor. On that side of each of the rings 24, 25, 26 which is nearer to the outer end 1a of the anchor hole 2a, the inside surface of the anchor hole 2a is formed with an annular ramp surface 27. Said inside surface of the anchor hole 2a is formed on the opposite side of each ring with an annular surface 28, which is radially outwardly offset from the inner rim of the adjacent ring 24, 25 or 26 to form a recess there. In order to form said annular surfaces 28, an elastically deformable, easily deformable or removable ring may be inserted beside each of the metal rings 24, 25 and 26 before the casting of the concrete used to make the concrete member formed with the anchor hole 2a. As is apparent from FIG. 3, the insertion of the anchor 9a, 10a into the anchor hole 2a causes the material of the zones 13a, 14a, 15a to flow radially outwardly as far as to the adjacent annular surface 28 so that the pluglike anchor will be positively and frictionally held in the anchor hole 2a.

Figure 5:
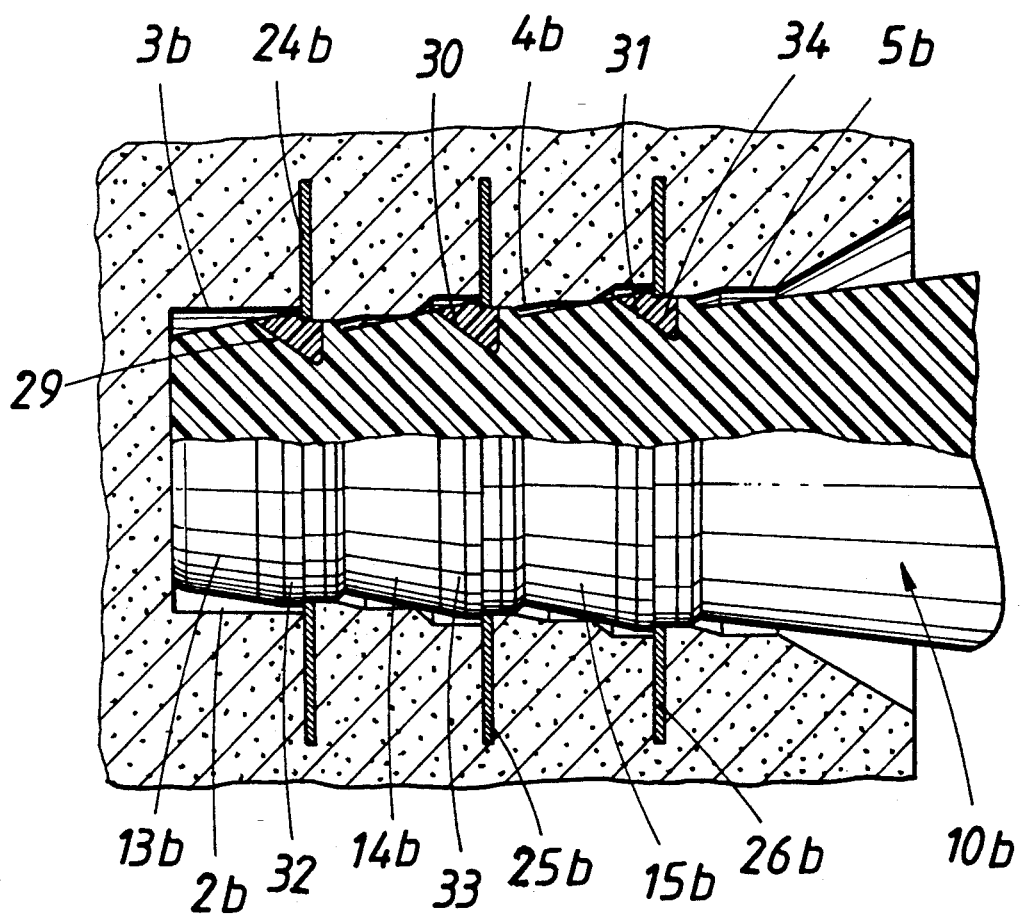
FIG. 5 is a view which also corresponds to the left-hand half of FIG. 1 and shows a further fixing device.

In accordance with FIG. 5, the anchor hole 2b comprises consecutive retaining zones 3b, 4b, 5b and is provided with rings 24b, 25b, 26b corresponding to the rings 24 to 26 of FIG. 3. Axially inwardly of each ring 24b, 25b, 26b the inside surface of the anchor hole 2b is formed in the associated zone 3b, 4b, 5b with an annular surface which is radially outwardly offset from the inner rim of the adjacent ring 24b, 25b, 26b. Adjacent to the retaining zones the body of the anchor head 10b is formed with annular grooves 29, 30, 31, which have a sawtooth-shaped profile in axial section and in which plastic rings are embedded, which consist of a plastic material that has a relatively high coefficient of friction and a relatively high entropy elasticity. The plastic rings are designated 32, 33, 34. In that case, too, the insertion of the anchor head 10b into the anchor hole 2b will cause the material of the rings 32, 33, 34 to flow behind the rings 24b, 25b, 26b radially outwardly as far as to the radially outwardly offset annular surfaces.

In all embodiments shown in the drawings, the intermediate member provided between the anchor heads 10 and 11 of anchors used to connect the same ring may differ in length, for instance, in order to provide wedge-shaped gaps between consecutive tubbing rings of the same annular assembly so that the tunnel lining may extend along an arc.

The deformable anchor elements are preferably made of a plastic material which has entropy elasticity. Such elastic material in which the molecular structure of the polymer permits the material to expand within certain limits after the material has been compressed. The material is molded by the so-called reaction injection molding process so that the isotropic properties of the material are improved. An example of a suitable material is is known as "Dowel-Polymer" and is available from and has been developed by Poloolast, Leonding, Austria, in cooperation with the present inventors.

All embodiments shown can be modified within the scope of the invention by an anchor which has the same exterior shape and is made of a wood whose fibers extend in the longitudinal direction of the anchor so that the forces which are exerted on the anchor as it is fixed in position will act substantially transversely to the direction of the fibers. Said wooden parts may consist each of a plurality of elements, which are joined with glue, and, for instance, in the embodiment shown in FIG. 1 the wooden body may be provided only outside the part 16 and/or may consist of annular inserts provided between the rings 20 to 23.

We claim:

1. Means for connecting two adjacent prefabricated concrete members having facing surfaces formed with a plurality of parallel, laterally spaced blind holes, respective ones of the blind holes being axially aligned and each one of the holes having an inside peripheral surface comprising a succession of axially spaced retaining zones increasing in average diameter toward the facing surfaces of the two concrete members, the connecting means comprising a like plurality of plug-like anchors adapted to be forced into the axially aligned blind holes, each one of the anchors being substantially stiff in the axial direction and having a respective elongated section adapted to extend axially into a respective blind hole of the axially aligned blind holes, and each one of the elongated sections having a leading end for insertion into the respective blind hole and a periphery comprising a succession of axially extending, substantially cylindrical portions of a plastic material elastically deformable at least in an approximately radial direction for an axially restraining frictional engagement with a respective one of the inside peripheral surface retaining zones of the respective blind hole, the cylindrical portions increasing in diameter in a direction extending away from the leading end, each cylindrical portion comprising a circumferentially extending annular pad of a plastic material which has a higher coefficient of friction than the plastic material of the cylindrical portion and defining an annular groove receiving the annular pad, each one of the annular grooves having a succession of sawteeth and the sawteeth of the annular groove having side faces rising toward the leading end.

2. The connecting means of claim 1, wherein the plastic material of the cylindrical portions is metal-reinforced.

3. The connecting means of claim 1, wherein the leading end of each elongated section is tapered, and each blind hole has an end portion tapering inwardly from the facing surfaces toward a first one of the retaining zones.

4. An assembly comprising two adjacent prefabricated concrete members having facing surfaces formed with a plurality of parallel, laterally spaced blind holes, respective ones of the blind holes being axially aligned and each one of the holes having an inside peripheral surface comprising a succession of axially spaced retaining zones increasing in average diameter toward the facing surfaces of the two concrete members, and a like plurality of plug-like anchors adapted to be forced into the axially aligned blind holes, each one of the anchors being substantially stiff in the axial direction and having a respective elongated section adapted to extend axially into a respective blind hole of the axially aligned blind holes, and each one of the elongated sections having a leading end for insertion into the respective blind hole and a periphery comprising a succession of axially extending, substantially cylindrical portions of a plastic material elastically deformable at least in an approximately radial direction for an axially restraining frictional engagement with a respective one of the inside peripheral surface retaining zones of the respective blind hole, the cylindrical portions increasing in diameter in a direction extending away from the leading end, each cylindrical portion comprising a circumferentially extending annular pad of a plastic material which has a higher coefficient of friction than the plastic material of the cylindrical portion and defining an annular groove receiving the annular pad, each one of the annular grooves having a succession of sawteeth and the sawteeth of the annular groove having side faces rising toward the leading end.

5. The assembly of claim 4, wherein the plastic material of the cylindrical portions is metal-reinforced.

6. The assembly of claim 4, wherein the leading end of each elongated section is tapered, and each blind hole has an end portion tapering inwardly from the facing surfaces toward a first one of the retaining zones.

7. Means for connecting two adjacent prefabricated concrete members having facing surfaces formed with a plurality of parallel, laterally spaced blind holes, respective ones of the blind holes being axially aligned and each one of the holes having an inside peripheral surface comprising a succession of axially spaced retaining zones increasing in average diameter toward the facing surfaces of the two concrete members, the connecting means comprising a like plurality of plug-like anchors adapted to be forced into the axially aligned blind holes, each one of the anchors being substantially stiff in the axial direction and having a respective elongated section adapted to extend axially into a respective blind hole of the axially aligned blind holes, and each one of the elongated sections having a leading end for insertion into the respective blind hole and a periphery comprising a succession of axially extending portions of a plastic material elastically deformable at least in an approximately radial direction for an axially restraining frictional engagement with a respective one of the inside peripheral surface retaining zones of the respective blind hole, the portions tapering slightly radially outwardly and increasing in average diameter in a direction extending away from the leading end, each portion comprising a circumferentially extending annular pad of a plastic material which has a higher coefficient of friction than the plastic material of the portion, and each portion defining an annular groove receiving the annular pad, each one of the annular grooves having a succession of sawteeth and the sawteeth of the annular groove having side faces rising toward the leading end.

8. The connecting means of claim 7, wherein the leading end of each elongated section is tapered, and each blind hole has an end portion tapering inwardly from the facing surfaces toward a first one of the retaining zones.

9. The assembly of claim 7, wherein the leading end of each elongated section is tapered, and each blind hole has an end portion tapering inwardly from the facing surfaces toward a first one of the retaining zones.

10. An assembly comprising two adjacent prefabricated concrete members having facing surfaces formed with a plurality of parallel, laterally spaced blind holes, respective ones of the blind holes being axially aligned and each one of the holes having an inside peripheral surface comprising a succession of axially spaced retaining zones increasing in average diameter toward the facing surfaces of the two concrete members, and a like plurality of plug-like anchors adapted to be forced into the axially aligned blind holes, each one of the anchors being substantially stiff in the axial direction and having a respective elongated section adapted to extend axially into a respective blind hole of the axially aligned blind holes, and each one of the elongated sections having a leading end for insertion into the respective blind hole, and each elongated section having a periphery comprising a succession of axially extending portions of a plastic material elastically deformable at least in an approximately radial direction of an axially restraining frictional engagement with a respective one of the inside peripheral surface retaining zones of the respective blind hole, the portions tapering slightly radially outward and increasing in average diameter in a direction extending away from the leading end, each portion comprising a circumferentially extending annular pad of a plastic material which has a higher coefficient of friction than the plastic material of the cylindrical portion, and each portion defining an annular grove receiving the annular pad, each one of the annular grooves having a succession of sawteeth and the sawteeth of the annular groove having side faces rising toward the leading end.

11. Means for connecting two adjacent components having facing surfaces formed with a plurality of parallel, laterally spaced blind holes, each one of said holes having an inside peripheral surface and respective ones of the blind holes in the facing surface of the adjacent components being axially aligned, the connecting means comprising a like plurality of plug-like anchors adapted to be forced into the axially aligned blind holes, each one of said anchors having a respective elongated section adapted to extend axially into a respective blind hole of the axially aligned blind holes and each one of said elongated anchor sections having a leading end for insertion into the respective blind hole, each of said anchors being substantially stiff in the axial direction and each elongated anchor section having a periphery comprising a succession of axially extending portions which are elastically deformable at least in an approximately radial direction for an axially restraining engagement with the inside peripheral surface of a respective one of the axially aligned blind holes, the axially extending portions increasing in average diameter in a direction extending away from the leading end, each anchor having a body of a plastic material reinforced by an axially extending metal tube embedded in the plastic material and axially spaced, radially extending retaining rings embedded in the plastic material, and each one of said axially extending portions comprising an annular pad of a plastic material which is more easily deformable than the plastic anchor body material and has a higher coefficient of friction that the plastic anchor body material, the annular plastic pads surrounding the anchor body and being arranged between successive ones of the retaining rings.

12. An assembly comprising two adjacent components having facing surfaces formed with a plurality of parallel, laterally spaced blind holes, each one of said holes having an inside peripheral surface and respective ones of the blind holes in the facing surfaces of the adjacent components being axially aligned, and a like plurality of plug-like anchors forced into the axially aligned blind holes, each one of the anchors having a respective elongated section extending axially into a respective blind hole of the axially aligned blind holes and each one of said elongated anchor sections having a leading end inserted into the respective blind hole, each of said anchors being substantially stiff in the axial direction and each elongated anchor section having a periphery comprising a succession of axially extending portions which are elastically deformable at least in an approximately radial direction for an axially restraining frictional engagement with the inside peripheral surface of a respective one of the axially aligned blind holes, the axially extending portions increasing in average diameter in a direction extending away from the leading end, the inside peripheral surface of each of said blind holes having a succession of axially spaced retaining zones in axially restraining frictional engagement with a respective one of the elongated anchor section portions, and each of said components comprising a radially inwardly projecting ring in each retaining zone, each of said rings defining an undercut on a side thereof facing away from the facing surfaces of the components and each ring having an inside diameter which is smaller than an outside diameter of an adjacent one of the elongated anchor section portions.

13. The assembly of claim 12, wherein each of the components consists of a prefabricated concrete member and the radially inwardly projecting rings are annular metal inserts embedded in the concrete member.

* * * * *